United States Patent
Hakanson

(10) Patent No.: US 9,804,271 B2
(45) Date of Patent: Oct. 31, 2017

(54) ADAPTIVE GNSS POWER SAVING CONTROL

(71) Applicant: Samsung Electronics Co., Ltd., Gyeonggi-do (KR)

(72) Inventor: Robin Hakanson, Cedar Rapids, IA (US)

(73) Assignee: Samsung Electronics Co., Ltd (KR)

( * ) Notice: Subject to any disclaimer, the term of this patent is extended or adjusted under 35 U.S.C. 154(b) by 231 days.

(21) Appl. No.: 14/681,547

(22) Filed: Apr. 8, 2015

(65) Prior Publication Data

US 2016/0195619 A1 Jul. 7, 2016

Related U.S. Application Data

(60) Provisional application No. 62/099,359, filed on Jan. 2, 2015.

(51) Int. Cl.
| | |
|---|---|
| *G01S 19/34* | (2010.01) |
| *G01S 19/23* | (2010.01) |
| *G01S 19/37* | (2010.01) |
| G01S 19/00 | (2010.01) |

(52) U.S. Cl.
CPC ............ *G01S 19/34* (2013.01); *G01S 19/23* (2013.01); *G01S 19/37* (2013.01)

(58) Field of Classification Search
CPC ...... G01S 19/34; G01S 5/0252; G01S 5/0294; G01S 5/0257; G01S 5/0018; G01S 19/23; G01S 19/37; G01S 5/14; G01S 19/01; G01S 19/13; G01S 19/35; G01C 21/165; H04B 17/24; A61B 5/0002

USPC ................................................... 342/357.74
See application file for complete search history.

(56) References Cited

U.S. PATENT DOCUMENTS

| | | | |
|---|---|---|---|
| 7,589,670 | B2 | 9/2009 | Ochenbauer |
| 8,022,870 | B2 | 9/2011 | Malaney |
| 8,059,027 | B2 * | 11/2011 | Khosravy ............... G01S 19/23 |
| | | | 342/357.25 |
| 8,072,379 | B2 | 12/2011 | Gopinath |
| 8,331,898 | B2 | 12/2012 | Waters et al. |
| 8,362,949 | B2 | 1/2013 | Yang et al. |

(Continued)

FOREIGN PATENT DOCUMENTS

WO WO2005/004502 A2 * 1/2005 ............. G01S 19/34

OTHER PUBLICATIONS

Paek, Jeongyeup et al., Energy-Efficient Positioning for Smartphones using Cell-ID . . . , MobiSys'11, Jun. 28-Jul. 1, 2011, Bethesda, Maryland, USA Copyright 2011 ACM, pp. 14.

*Primary Examiner* — Bernarr Gregory
(74) *Attorney, Agent, or Firm* — The Farrell Law Firm, P.C.

(57) ABSTRACT

Methods and apparatuses are provided for a portable device to minimize power consumption of its measurement engine while maintaining a desired level of accuracy. One such method forms a control loop, in which a value of a metric indicating a difference between the current estimated accuracy and the desired level of accuracy is calculated and then filtered to produce one or more filtered values. Using the one or more filtered values and current values of one or more modifiable measurement parameters, new values for the one or more modifiable measurement parameters are generated and then used to take the next measurement.

20 Claims, 3 Drawing Sheets

(56) References Cited

U.S. PATENT DOCUMENTS

| | | | |
|---|---|---|---|
| 2004/0041728 A1* | 3/2004 | Bromley | G01S 5/0018 342/357.64 |
| 2009/0040103 A1* | 2/2009 | Chansarkar | G01S 19/37 342/357.74 |
| 2009/0070038 A1 | 3/2009 | Geelen et al. | |
| 2009/0168843 A1* | 7/2009 | Waters | G01S 19/34 375/130 |
| 2010/0033339 A1* | 2/2010 | Gurley | G01S 5/14 340/686.1 |
| 2010/0171659 A1* | 7/2010 | Waters | H04B 17/24 342/357.74 |
| 2010/0295623 A1* | 11/2010 | Gronemeyer | G01S 19/23 331/44 |
| 2011/0037649 A1 | 2/2011 | Rao | |
| 2011/0071759 A1* | 3/2011 | Pande | G01C 21/165 701/469 |
| 2012/0133554 A1* | 5/2012 | Bromley | G01S 5/0018 342/357.25 |
| 2014/0192560 A1 | 7/2014 | Ou et al. | |
| 2014/0214314 A1 | 7/2014 | Segev et al. | |
| 2014/0253377 A1* | 9/2014 | Scalisi | G01S 19/34 342/357.74 |
| 2014/0275850 A1* | 9/2014 | Venkatraman | A61B 5/0002 600/301 |
| 2015/0087332 A1* | 3/2015 | Pijl | G01S 19/34 455/456.1 |

\* cited by examiner

ADAPTIVE GNSS POWER SAVING CONTROL

PRIORITY

The present application claims priority under 35 U.S.C. §119(e) to U.S. Provisional Application No. 62/099,359, entitled "Adaptive GNSS Power saving control," which was filed on Jan. 2, 2015, the contents of which are incorporated herein by reference.

BACKGROUND OF THE INVENTION

Field of the Invention

The present invention relates generally to saving power in a portable device which includes a measurement engine and, more specifically, to a portable device with a Global Navigational Satellite System (GNSS) receiver that maintains a desired level of accuracy in its GNSS solutions while minimizing resource usage such as power consumption by the GNSS receiver.

Description of the Related Art

Satellite navigational systems provide positional and sometimes time information to earth-bound receivers. Each system has its own constellation of satellites orbiting the Earth, and, in order to calculate its position, a receiver in that system on Earth uses the satellites "in view" (i.e., in the sky above) of that system's constellation. Generally, the larger the number of satellites in view, the more accurate the calculation of the receiver's position will be. "Global Navigational Satellite Systems (GNSS)" is often used as the generic term for such systems, even though such navigational satellite systems include, e.g., regional and augmented systems—i.e., systems that are not truly "global."

As the electronics for GNSS receivers have gotten smaller, and the positional calculations have become more accurate, the use of GNSS functions has become ubiquitous in consumer and other electronic devices, from cellular telephones to automobiles. And, as the number of uses for GNSS receivers has grown substantially and is still growing, the number of GNSS systems, both planned and presently operational, is also growing. The widely-known, widely-used, and truly global Global Positioning System (GPS) has been joined by one other global system, the GLObalnaya NAvigatsionnaya Sputnikovaya Sistema (GLONASS), and will be joined by the Galileo and Beidou systems—each of which has, or will have, its own constellation of satellites orbiting the globe.

Regional systems (those that are not global, but intended to cover only a certain region of the globe) include the Quasi-Zenith Satellite System (QZSS) and the Indian Regional Navigational Satellite System (IRNSS) currently being developed. Augmented systems (which are normally regional as well, and which "augment" with, e.g., messages from ground-based stations and/or additional navigational aids) include Wide Area Augmentation System (WAAS), European Geostationary Navigation Overlay Service (EGNOS), Multi-functional Satellite Augmentation System (MSAS), and GPS Aided Geo Augmented Navigation (GAGAN). The term "GNSS," as used herein, covers any type of navigational satellite system, global or not, unless expressly indicated otherwise.

Multi-constellation GNSS receivers receive signals from more than one satellite constellation (e.g., two or more of GPS, Galileo, GLONASS, and/or Beidou) and provide much greater accuracy because the number of unblocked satellites, sometimes referred to as satellite/space vehicles (SVs), overhead at any time from several constellations is always greater than the number of SVs overhead from a single constellation. The term "GNSS receiver," as used herein, covers any type of GNSS receiver, global or not, single or multi-constellation, unless expressly indicated otherwise.

FIG. 1 is a simplified, conceptual representation of a portable device 100 with a GNSS receiver. A System Control Engine 110 controls at least the components related to measurement, positioning, and navigation. Among these, there are a GNSS Measurement Engine 121, Measurement Engine 123, Measurement Engine 125, and other possible measurement engines. Measurement Engines 123 and 125 and the other possible measurement engines may be based on a variety of sources, and provide a wide variety of environmental information. Navigation Engine 130 takes in the measurement information and calculates a navigation solution. As would be understood by one of ordinary skill in the art, a number of feedback loops are normally implemented in regards to a navigation engine, which continually adjust and correct various parameters as, e.g., signal conditions change. In that regard, many of the parameters of the GNSS Measurement Engine 121 may be adjusted, such as, e.g., the duty cycle of the GNSS Measurement Engine 121, how many or which satellites to track (in order to generate measurements for a period of time), etc.

However, although GNSS receivers are getting smaller, more accurate, and ubiquitous, a fundamental problem remains: calculating position/time solutions with a GNSS receiver is a resource-intensive operation. In fact, the GNSS components while operating in a cellular telephone can be the single largest user of power—even during a telephone conversation.

Thus, there is a need for a method to reduce the resource-intensive nature of GNSS reception and processing in a portable device, while also maintaining a desired level of positional accuracy.

SUMMARY OF THE INVENTION

Accordingly, the present invention has been made to address at least the problems and/or disadvantages described above and to provide at least the advantages described below. In one aspect of the present invention, a portable device is provided which minimizes power consumption by a measurement engine while maintaining a level of quality set by the user. In another aspect of the present invention, a method is provided which automatically scales power consumption of a measurement engine in a portable device up or down depending on current environmental and operating conditions while still meeting the level of accuracy desired by the user. In yet another aspect of the present invention, a control loop is used to control one or more measurement parameters based on the actual current accuracy, rather than by, for example, using a predetermined table or algorithm based on one or more probability models. In still another aspect of the present invention, adaptive control of the duty cycle of the radiofrequency (RF) transceiver is provided.

In accordance with one aspect of the present invention, a method for a portable device having a measurement engine is provided, including (a) calculating an estimated accuracy of a current measurement from the measurement engine; (b) calculating a value of a metric indicating a difference between the current estimated accuracy and a desired level of accuracy; (c) generating one or more filtered values by filtering (i) the value calculated in step (b) and (ii) current values of one or more modifiable measurement parameters which were used in taking the current measurement; (d) generating values for one or more modifiable measurement parameters to be used in taking a next measurement using the one or more filtered values from step (c); (e) taking a next measurement using the values for one or more modifiable measurement parameters generated in step (d); and (f) returning to step (a).

In accordance with another aspect of the present invention, a portable device is provided, including a system control engine which calculates an estimated accuracy of a current measurement from a measurement engine, calculates a value of a metric indicating a difference between the current estimated accuracy and a desired level of accuracy, generates one or more filtered values by filtering the calculated value of the metric indicating a difference between the current estimated accuracy and a desired level of accuracy and current values of one or more modifiable measurement parameters which were used in taking the current measurement, and generates values for one or more modifiable measurement parameters to be used in taking a next measurement using the one or more generated filtered values; and the measurement engine which takes a next measurement using the generated values for the one or more modifiable measurement parameters.

In accordance with yet another aspect of the present invention, a portable device is provided, including at least one non-transitory computer-readable medium; and one or more processors, wherein the one or more processors, when executing a set of instructions stored in the at least one non-transitory computer-readable medium, controls the portable device to perform the following steps: (a) calculating an estimated accuracy of a current measurement from the measurement engine; (b) calculating a value of a metric indicating a difference between the current estimated accuracy and a desired level of accuracy; (c) generating one or more filtered values by filtering (i) the value calculated in step (b) and (ii) current values of one or more modifiable measurement parameters which were used in taking the current measurement; (d) generating values for one or more modifiable measurement parameters to be used in taking a next measurement using the one or more filtered values generated in step (c); (e) taking a next measurement using the values for one or more modifiable measurement parameters generated in step (d); and (f) returning to step (a).

BRIEF DESCRIPTION OF THE DRAWINGS

The above and other aspects, features, and advantages of embodiments of the present invention will be more apparent from the following detailed description taken in conjunction with the accompanying drawings, in which.

DETAILED DESCRIPTION OF EMBODIMENTS OF THE PRESENT INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Various embodiments may comprise one or more elements. An element may comprise any structure arranged to perform certain operations. Although an embodiment may be described with a limited number of elements in a certain arrangement by way of example, the embodiment may include more or less elements in alternate arrangement as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Embodiments of the present invention minimize power consumption while maintaining a level of quality (location accuracy) set by the user. In this manner, a portable device according to an embodiment of the present invention will automatically scale its power consumption up or down depending on current environmental and signal conditions and still meet the level of accuracy desired by the user.

In one embodiment described further below, the radiofrequency (RF) duty cycling—i.e., the proportion of time the RF transceiver is "on" (and thus the signal processing components in the portable device are active) vs. the proportion of time the RF transceiver is "off" (when the signal processing components in the portable device are inactive)—of a GNSS engine in a portable device is reduced in order to save on power consumption, while a control loop is implemented to ensure a desired level of accuracy.

Figure 1:
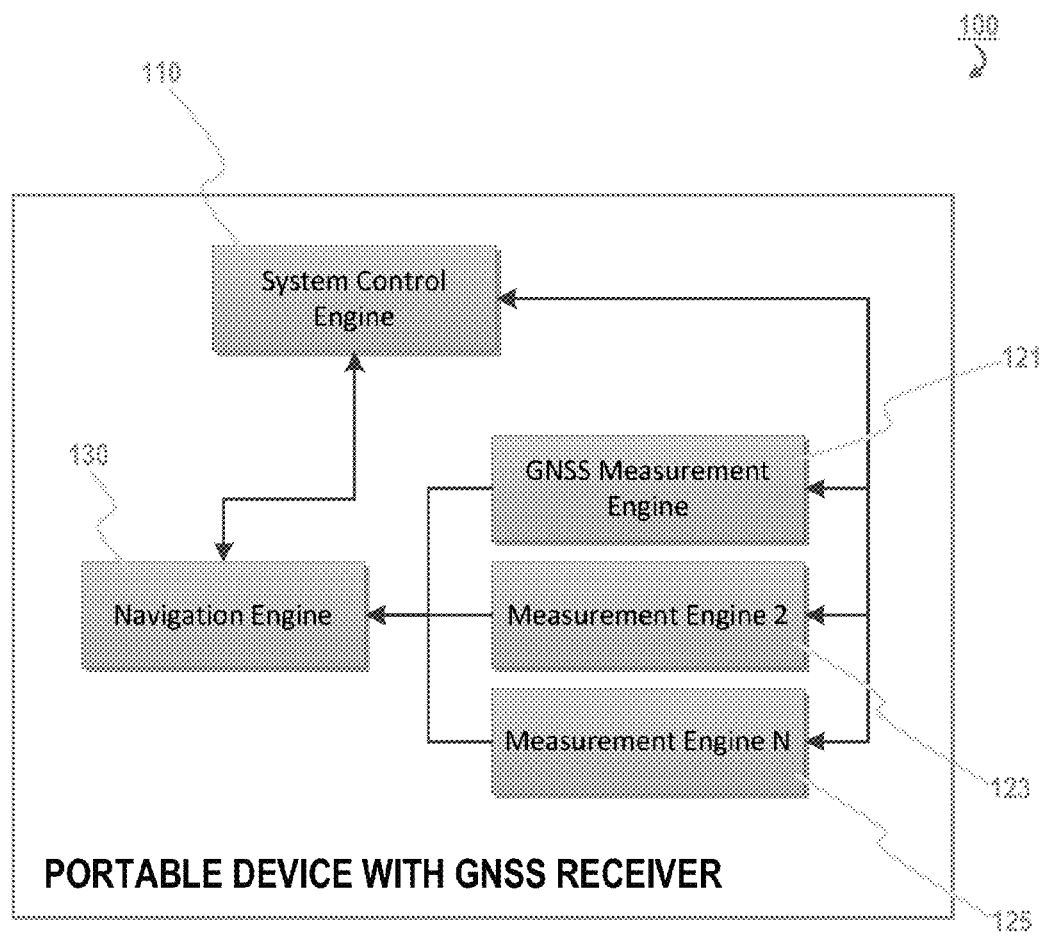
FIG. 1 is a simplified, conceptual representation of a portable device 100 with a GNSS receiver to which embodiments of the present invention may be applied.
Figure 2:
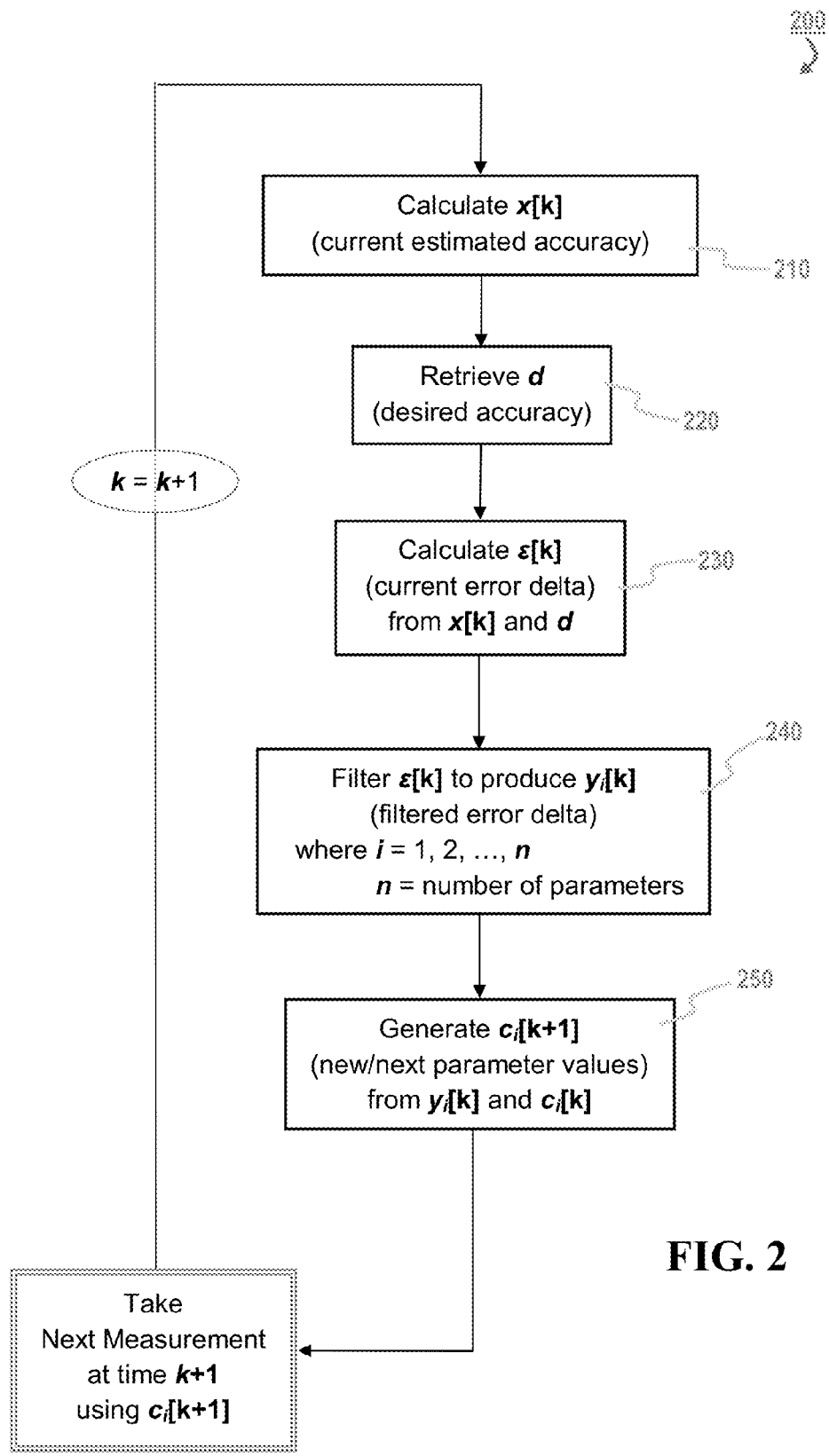
FIG. 2 is a flowchart of a method according to an embodiment of the present invention.

FIG. 2 is a flowchart of a method according to an embodiment of the present invention. Since the process is continually repeating (at least while measurements are being taken), the flowchart is represented as a loop in which a measurement is taken and then the counter/time is incremented (represented by k=k+1 in the oval before the process repeats) before the next measurement is taken. One or more measurement parameters $c_i$ are adaptively modified in the control loop, based on the estimated accuracy x[k] of the current measurement and the desired accuracy d. The modifiable measurement parameters are represented by $c_i$, where i=1, 2, . . . , n, and n is the number of modifiable measurement parameters.

In step 210, the accuracy of the current measurement is estimated. In this embodiment, the current estimated accuracy x[k] is calculated by the commonly used Estimated Horizontal Error (EHE) method, which is a function of Dilution of Precision (DOP), measurement ranging error, and satellite position estimation error. However, as would be understood by one of ordinary skill in the art, a wide variety of error models and error measuring methods in accordance with those error models are available for calculating accuracy and/or error. In general, each are a function of DOP (which is basically a scaling factor based on the device's and satellites' current positions), measurement ranging error (the error in estimating the distance to a satellite, which can be affected by any of the atmosphere, multipath signals, signal strength, clock errors, correlation/tracking implementations, etc.), and satellite position estimation error (the error in estimating the satellite's position in the sky).

In step 220, the desired accuracy d is retrieved. The desired accuracy d may be set by one or more of the manufacturer of the portable device, the operating system, firmware, or platform of the portable device, the application using the position values, the mapping/position application, other hardware/software in the portable device, external input, and/or the user. Accordingly, the desired accuracy d may be set differently based on the application. Moreover, the desired accuracy d may be adaptive, i.e., change over time based on environmental conditions, device conditions (such as, e.g., battery life), system conditions, and/or user input.

When the value for the desired accuracy d is input by the user, it may be input by the user in a large variety of ways, as would be understood by one of ordinary skill in the art. In this embodiment, the user inputs a 95 percentile 2D error (commonly known as "R95"), which indicates the user does not require GNSS accuracy beyond that level. However, as would be understood by one of ordinary skill in the art, the metric for accuracy (or error) can take a large variety of forms, at least by varying, e.g., the percentile and/or combining at least one of the horizontal, vertical, and 3D error, etc. In some embodiments, d may be changed at any time by the user. In other embodiments, the user may turn this function on or off, thereby maximizing accuracy without regard to power consumption.

In some embodiments, the user may set the conditions under which the function is activated and/or deactivated, such as, for example, if the portable device is moving above a certain speed threshold, or if the portable device is located a certain distance from home, work, and/or frequently-visited locations. In some embodiments, the user may use more than one metric for setting d. In some embodiments, a Graphical User Interface (GUI) is provided for the user to set d as represented by a circle on a map, where the circle remains displayed, thereby indicating the approximate range of error on the map when the measurement function is being used. All of these variations and more apply equally when the desired accuracy d is set automatically by the operating system, firmware, or platform of the portable device, the application currently using the position values, the mapping/position application, etc.

In step 230, $\epsilon[k]$, a metric for indicating the difference between the current estimated accuracy $x[k]$ and the desired accuracy d, is calculated. In one embodiment described further below, $\epsilon[k]$ is the "error delta," the value of the difference ($x[k]-d$). Thus, in that embodiment, when $\epsilon[k]$ is positive, $x[k]$ is greater than d, meaning that the current accuracy exceeds the desired accuracy, and thus the modifiable measurement parameters may be loosened in order to save power. When $\epsilon[k]$ is negative, $x[k]$ is less than d, meaning that the current accuracy is less than the desired accuracy, and thus the modifiable measurement parameters must be tightened to ensure the measurements provide the desired accuracy d. In this embodiment, $\epsilon[k]$, $x[k]$, and d are all in the same units.

In step 240, $\epsilon[k]$ is filtered in order to provide a stable system, thereby producing one or more $y_i[k]$, the filtered error delta(s). The exact type of filtering used depends on which measurement parameters are modifiable in the particular implementation. In one embodiment, an averaging filter with cutoffs is used. An averaging filter minimizes the fluctuations in error when conditions are stable, quickly responds when conditions worsen quickly, and then slowly improves the power savings as conditions improve. The cutoffs are added for when conditions deteriorate very quickly, and there is no need to wait for the averaging filter to catch up. As would be understood by one of ordinary skill in the art, other filters and/or feedback modification techniques could be used in accordance with the present invention. The filter function takes into account that the next set of measurements is already being taken for the next position solution (i.e., that the process is continually looping), as shown by the feedback loop in FIG. 3, discussed further below.

The output of the filter function in step 240 is $y_i[k]$, the filtered error delta, which is used to control the generation and tuning of the measurement parameters in step 250. The number of $y_i[k]$ output depends on the number n of modifiable measurement parameters $c_i$ in the embodiment, where i=1, 2, . . . , n, because the type of filtered error deltas needed to generate the next measurement parameters $c_i$ may vary depending on the specific parameter (see discussion of specific embodiments below). In some embodiments, there may be a plurality of modifiable measurement parameters and only one output $y_i[k]$, because that filtered error delta can be used to generate and tune each of the plurality of parameters $c_i$.

In step 250, both $y_i[k]$, the filtered error delta(s), and $c_i[k]$, the current parameter value(s), are used to generate $c_i[k]$, the parameter value(s) to be used to take the next measurement. As shown in FIG. 2, the process then repeats, after re-setting k=k+1.

In this embodiment, there is a fixed set of modifiable measurement parameters $c_i$. However, in other embodiments, the members and/or number of modifiable measurement parameters $c_i$ may vary according to current conditions and/or other parameters. This, of course, would establish another control loop, possibly nested within the control loop shown in FIG. 2.

Using embodiments of the present invention, the desired level of accuracy may be maintained while still minimizing resource usage, such as, e.g., power consumption.

Depending on the embodiment of the present invention, steps and/or operations in accordance with the present invention may occur in a different order, or in parallel, or concurrently for different epochs, etc., as would be understood by one of ordinary skill in the art. Similarly, as would be understood by one of ordinary skill in the art, FIG. 2 is a simplified representation of the actions performed, and real-world implementations may perform the actions differently, such as, for example, integrating parts of the actions into the steps already performed by the GNSS measurement engine. Similarly, as a simplified representation, FIG. 2 does not show other required steps as these are known and understood by one of ordinary skill in the art and not pertinent and/or helpful to the present description.

Figure 3:
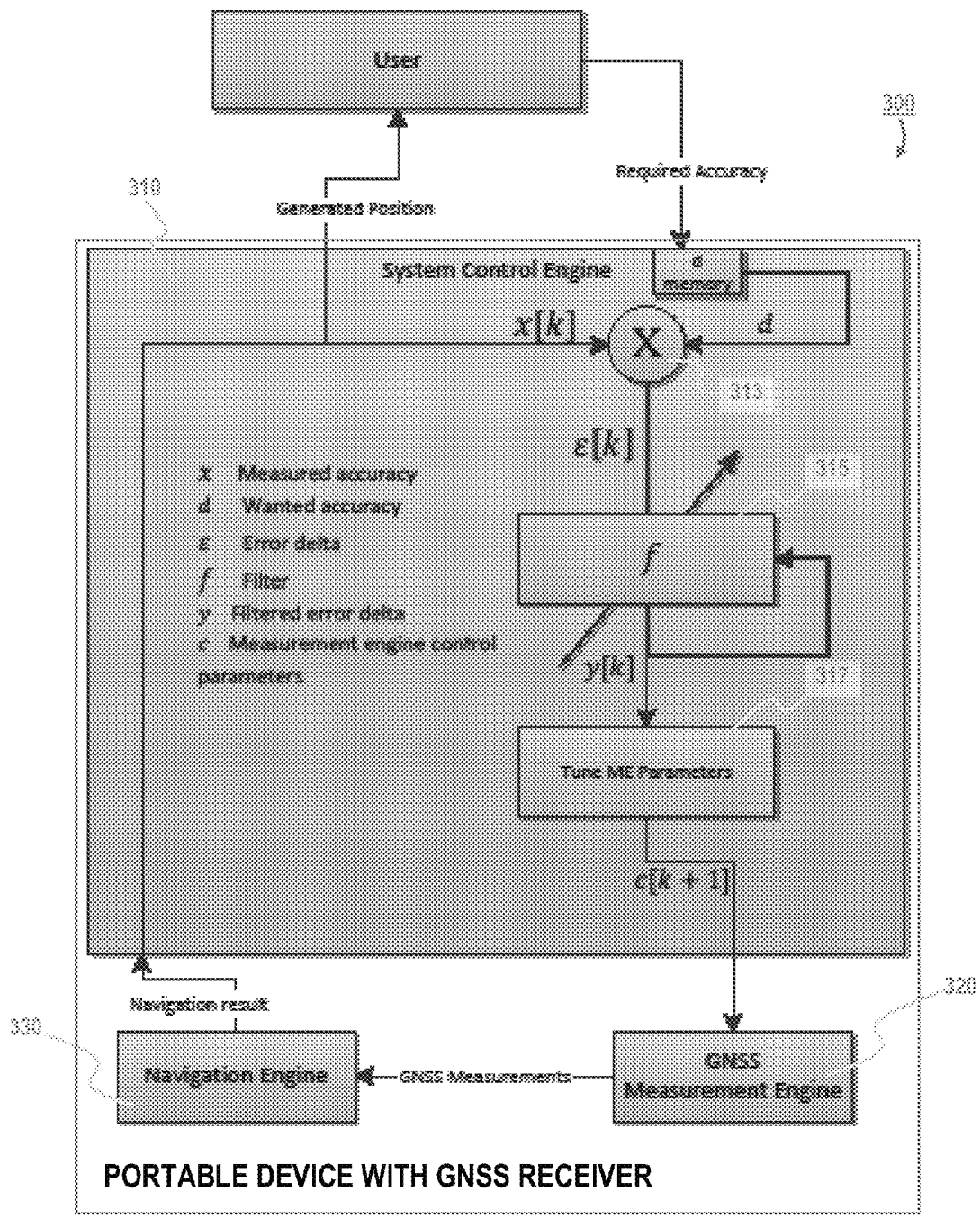
FIG. 3 is a diagram of a portable device 300 with a GNSS receiver according to an embodiment of the present invention.

FIG. 3 is a diagram of a portable device 300 with a GNSS receiver according to an embodiment of the present invention. The main components of portable device 300 are the System Control Engine 310, the GNSS Measurement Engine 320, and the Navigation Engine 330. The user, who indicates the desired accuracy as input and receives the generated position solution as output, is indicated at the top of FIG. 3. As would be understood by one of ordinary skill in the art, all of the components/functions not directly related to the present description are omitted. For example, although a single line is shown from Navigation Engine 330 to the "Generated Position" for the user and the x[k] input to Mixer 313, The user's input of the desired accuracy d is stored in memory, and input as a negative value into Mixer 313, while the currently estimated accuracy x[k] (or, more accurately, the estimated accuracy at time k) is input as a positive value into Mixer 313. In this embodiment, the user provides input for the desired accuracy d, but, as discussed above, other embodiments may have no user input involved and may be set entirely by hardware, software, and/or firmware. The output of Mixer 313 is the value of the difference (x[k]−d), the "error delta" EN which indicates the difference between the current accuracy and the desired accuracy. When ϵ[k] is positive, x[k] is greater than d, meaning that the current accuracy exceeds the desired accuracy, and thus the measurement parameters may be loosened in order to save power. When ϵ[k] is negative, x[k] is less than d, meaning that the current accuracy is less than the desired accuracy, and thus the measurement parameters should be tightened in order to obtain the desired level of accuracy.

ϵ[k] is input into Filter $f_i$ 315, which performs one or more filtering functions $f_i$ on ϵ[k], to provide stability and appropriate control signals for the generation and tuning of the measurement parameters. Filter $f_k$ 315 also (and the control loop in general) needs to account for the fact that the next set of measurements is already being generated for the next position solution (i.e., that the process is continually looping), which, for Filter $f_k$ 315, is assisted by a feedback loop of its output.

Filter $f_i$ 315 outputs $y_i[k]$, the filtered error delta, which is used to control the generation and tuning of the measurement parameters. Specifically, Module 317 receives $y_i[k]$ as control input, and uses it to control the generation and tuning of new values for the one or more parameters $c_i[k]$. Module 317 also receives the current parameter values $c_i[k]$ as input for generating the next parameter values $c_i[k+1]$ (as shown by the $c_i[k]$ input on the side of Module 317, which means the previous parameter values were latched when they were output).

Taking $y_i[k]$, the filtered error delta as input, Module 317 generates the next parameter values $c_i[k+1]$ as output. These output parameter values $c_i[k+1]$ are used as control input to GNSS Measurement Engine 320 for generating the next GNSS measurements, which are input into Navigation Engine 330 to produce the navigation result.

Two embodiments of methods for adaptive GNSS power savings according to the present invention will be considered below: one where the single parameter being tuned is the duty cycle of the transceiver component(s) $c_{duty}[k]$, the other with both $c_{duty}[k]$ and satellite control $c_{\#SV}$ being tuned.

Duty Cycle Only Control

In this embodiment, there is only one Measurement Engine (ME) parameter to modify, the radiofrequency (RF) duty cycling—i.e., the proportion of time the RF receiver (or transceiver) is "on" (and thus the signal processing components in the portable device are active) vs. the proportion of time the RF receiver (or transceiver) is "off" (when the signal processing components in the portable device are inactive). Reducing the duty cycle translates into a direct loss in received signal strength, and this signal strength loss in dB generally translates into some kind of loss in end solution accuracy. However, how much loss of accuracy or error depends heavily on a lot of environmental factors which are capable of rapid change. Because of this, using a formal set of predetermined rules or an algorithm with one or more fixed numbers generally results in inefficiencies. In embodiments of the present invention, a control loop is used to control the one or more parameters based on the actual current accuracy, rather than by, for example, using a predetermined table or algorithm based on one or more probability models.

As an example, a duty cycle where the RF components are kept on for 400 µs and off for 400 µs would constitute a 50% duty cycle. This would result in a roughly 50% power savings for the RF reception and digital signal processing (DSP) components at a cost of 50% received signal strength (−3 dB). The duty cycle could range from 100% ON, with no loss in received signal strength and no power savings, to 5% ON, with −13 dB loss in received signal strength and roughly 95% power savings. The step size could be quite small to provide granular tuning to adapt to changing environmental conditions. In some embodiments, only high-power, high-rate components involved with RF reception and DSP would be subject to a changing duty cycle, while lower rate tracking components would stay system-normal. In any event, power consumption is reduced at the cost of received signal strength, and thus accuracy, while the control loop also maintains a desired level of accuracy.

As previously discussed in reference to FIG. 3, the input to the control loop is the desired accuracy d as well as the current estimated accuracy x[k]. In this embodiment, x[k] is estimated as the 95 percentile horizontal error. In some embodiments, d is an increased version (which in this case would correspond to a lower value) of the user's input desired accuracy in order to provide a "cushion" when and/or if d is exceeded. The error delta ϵ[k], calculated by subtracting d from x[k], indicates whether the accuracy needs to be increased (because it is below the desired accuracy d) or can be allowed to deteriorate (because it is above the desired accuracy d) in order to save resources, such as power. In this embodiment, increasing the accuracy means increasing the ON time of the duty cycle, while allowing the accuracy to deteriorate means decreasing the ON time of the duty cycle.

As discussed above in reference to FIG. 3, ϵ[k] is input into Filter f 315, which in turn outputs y[k] the filtered error delta, to Module 317. For example, in one embodiment, the value of filter output y[k] could be from zero (0) to one (1), where y[k]=1 means a full 100% duty cycle with no power savings and y[k]=0 means the least possible duty cycle, such as 5%, with the maximum power savings. In such an embodiment, if ϵ[k] is greater than or equal to a threshold value (a cutoff value), Filter f 315 would output y[k]=1 to reset to a full 100% duty cycle. Otherwise, when ϵ[k] is less than the threshold value, Filter f 315 would output y[k]=y[k−1]+ϵ[k]/5, assuming Filter f 315 is averaging over 5 clock ticks. As would be understood by one of ordinary skill in the art, the y[k] output equation could have a large variety of different coefficients to be applied to each of the inputs y[k−1] and ϵ[k], as well as additional terms and/or variables to take into account other factors.

Module 317 generates the next parameter value $c_{duty}[k+1]$ from at least Filter f 315 output y[k]. Following the example of the embodiment discussed in the immediately preceding paragraph, if the value of filter output y[k] was 1, $c_{duty}[k+1]$ would indicate a 100% duty cycle; if the value of filter output y[k] was 0, $c_{duty}[k+1]$ would indicate the minimal possible duty cycle; and, for the values of filter output y[k] between 0 and 1, $c_{duty}[k+1]$ would indicate the duty cycle best suited for maximizing power savings while maintaining the user's desired accuracy level. Finally, duty cycle parameter value $c_{duty}[k+1]$ is used to control the generation of the next GNSS measurement by the GNSS Measurement Engine 320. As discussed above in reference to FIG. 3, the generated GNSS measurement is input into Navigation Engine 330 to produce the navigation result, which results in both the generated position for the user and the new estimated accuracy x[k+1] (the estimated accuracy at time k+1).

Duty Cycle+Satellite Selection Control

In this embodiment, two GNSS parameters are used for adaptive GNSS power savings: $c_{duty}$, the duty cycle, and $c_{\#SV}$, the number of satellites to track.

As known by one of ordinary skill in the art, algorithms exist which maximize the solution accuracy by using only a subset of the set of available satellites. Some of these algorithms use signal strength and satellite location (so the subset provides good geometry for the navigation solution) to select the subset of N satellites to track out of the set of M available satellites. The $c_{\#SV}$ parameter in this embodiment is the number N of satellites in the tracking subset.

In this embodiment, the single output parameter $\epsilon$ indicates whether to relax or tighten the two separate measurement parameters $c_{duty}$, the duty cycle, and $c_{\#SV}$, the number of satellites to track. Because changing the number of satellites being tracked has less of an impact on overall power consumption than changing the duty cycle, this embodiment treats $c_{\#SV}$ as a secondary parameter and $c_{duty}$, as a primary parameter. As a secondary parameter, $c_{\#SV}$ is set to its maximum value whenever $\epsilon$ becomes unstable, and will only vary when $\epsilon$ becomes relatively stable. This ensures that this secondary parameter will not inordinately affect the primary parameter's effect on power consumption at times of instability. At times of relative stability, $c_{\#SV}$ will vary based on the current value of $\epsilon$, and will only reset to its maximum value when $\epsilon$ exceeds a threshold value.

Filter $f_i$ 315 receives input $\epsilon[k]$ and outputs $y_{duty}[k]$ and $y_{\#SV}[k]$. Using input $y_{duty}[k]$, $y_{\#SV}[k]$, $c_{duty}[k]$, and $c_{\#SV}[k]$, Module 317 generates the next parameter values $c_{duty}[k+1]$, and $c_{\#SV}[k+1]$. In this embodiment, the current parameter value $c_{duty}[k]$ and filtered error delta $y_{duty}[k]$ are used to generate the next parameter value $c_{duty}[k+1]$ in the same manner as the embodiment above. The current parameter value $c_{\#SV}[k]$ and filtered error delta $y_{\#SV}[k]$ are used to generate the next parameter value $c_{\#SV}[k+1]$ similarly. Next, new parameter values $c_{duty}[k+1]$ and $c_{\#SV}[k+1]$ are used to control the generation of the next GNSS measurement. As discussed above, the generated GNSS measurement is input into Navigation Engine 330 to produce the navigation result, which results in both the generated position for the user and the new estimated accuracy $x[k+1]$.

In other embodiments, the one or more measurement parameters $c_i$ may also vary based on at least one of current environmental conditions, current operating conditions, and a predetermined pattern. For example, certain parameters could be added and/or removed based on any one or more of the current environmental conditions, current operating conditions, and a predetermined pattern. As another example, the number of modifiable parameters could be changed based on any one or more of the current environmental conditions, current operating conditions, and a predetermined pattern.

In the description above for one of ordinary skill in the art, a portable device is provided which minimizes power consumption by a measurement engine while maintaining a level of quality set by the user. Moreover, a method is described in which power consumption of a measurement engine in a portable device is automatically scaled up or down depending on current environmental and operating conditions while still meeting the level of accuracy desired by the user. One or more, smaller or larger, feedback control loops are used to control one or more measurement parameters based on at least the actual current accuracy, rather than by, for example, using a predetermined table or algorithm based on one or more probability models. In one embodiment, adaptive control of the duty cycle of the RF receiver and DSP components for GNSS solutions in a portable device is used to maximize power savings while maintaining a desired level of accuracy.

Depending on the embodiment of the present invention, some or all of the steps and/or operations may be implemented or otherwise performed, at least in part, on a portable device. "Portable device" as used herein refers to any portable, mobile, or movable electronic device having the capability of receiving wireless signals, including, but not limited to, multimedia players, communication devices, computing devices, navigating devices, etc. Thus, mobile devices include (but are not limited to) laptops, tablet computers, Portable Digital Assistants (PDAs), mp3 players, handheld PCs, Instant Messaging Devices (IMD), cellular telephones, Global Navigational Satellite System (GNSS) receivers, watches, or any such device which can be worn and/or carried on one's person.

Depending on the embodiment of the present invention, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware, hardware, and/or any combination thereof. Moreover, the functionality of any "module" discussed herein may be implemented in software, firmware, hardware, and/or any combination thereof.

The one or more non-transitory computer-readable media and/or means for implementing/performing one or more operations/steps/modules of embodiments of the present invention may include, without limitation, application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of any system components and data structures may also be stored as data signals on a variety of non-transitory computer-readable transmission mediums, from which they are read and then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced in any computer system configuration.

Thus, the term "non-transitory computer-readable medium" as used herein refers to any medium that comprises the actual performance of an operation (such as hardware circuits), that comprises programs and/or higher-level instructions to be provided to one or more processors for performance/implementation (such as instructions stored in a non-transitory memory), and/or that comprises machine-level instructions stored in, e.g., firmware or non-volatile memory. Non-transitory computer-readable media may take many forms, such as non-volatile and volatile media, including but not limited to, a floppy disk, flexible disk, hard disk, RAM, PROM, EPROM, FLASH-EPROM, EEPROM, any memory chip or cartridge, any magnetic tape, or any other magnetic medium from which a computer instruction can be read; a CD-ROM, DVD, or any other optical medium from which a computer instruction can be read, or any other non-transitory medium from which a computer instruction can be read.

While several embodiments of the present invention have been shown and described herein, it will be understood by those of ordinary skill in the art that various changes in form and details may be made therein without departing from the spirit and scope of the present invention—i.e., the invention is not limited to any embodiments described herein, but is defined by the appended claims and their equivalents.

What is claimed is:

1. A method for a portable device having a Global Navigational Satellite System (GNSS) measurement engine, comprising:
    (a) calculating an estimated accuracy of a current measurement from the GNSS measurement engine;
    (b) calculating a value of a metric indicating a difference between the current estimated accuracy and a desired level of accuracy;
    (c) generating at least one filtered value by filtering:
        (i) the value calculated in step (b), and
        (ii) a current value of at least one or more modifiable measurement parameter used in taking the current measurement,
        where the at least one modifiable measurement parameter comprises a duty cycle of one or more components used in at least one of radiofrequency (RF) signal reception and digital signal processing (DSP) of GNSS signals;
    (d) generating a value for each of the at least one modifiable measurement parameter to be used in taking a next measurement using the at least one filtered value generated in step (c);
    (e) taking a next measurement using the values for each of the at least one modifiable measurement parameter generated in step (d); and
    (f) returning to step (a).

2. The method of claim 1, wherein the at least one modifiable measurement parameter comprises a duty cycle of the GNSS measurement engine.

3. The method of claim 1, wherein the metric indicating a difference between the current estimated accuracy and the desired level of accuracy comprises the current estimated accuracy subtracted by the desired level of accuracy.

4. The method of claim 1, further comprising:
    receiving input from a user of the portable device concerning the level of desired accuracy.

5. The method of claim 1, wherein the calculating in step (b) comprises:
    mixing the current estimated accuracy and a desired level of accuracy.

6. The method of claim 1, wherein the filtering in step (c) comprises:
    computing a function using (i) the value calculated in step (b) and (ii) the current value of at least one modifiable measurement parameter used in taking the current measurement.

7. The method of claim 1, wherein steps (a)-(f) are only performed while the GNSS measurement engine is being used.

8. The method of claim 1, further comprising:
    varying membership of a group of the at least one modifiable measurement parameter based on at least one of current environmental conditions, current operating conditions, and a predetermined pattern.

9. The method of claim 1, further comprising:
    varying a total number of the at least one modifiable measurement parameter based on at least one of current environmental conditions, current operating conditions, and a predetermined pattern.

10. The method of claim 1, wherein the estimated accuracy of the current measurement from the GNSS measurement engine is measured in at least one of Dilution of Precision (DOP), vertical error, horizontal error, and clock error.

11. A portable device, comprising:
    a system control engine which:
        calculates an estimated accuracy of a current measurement from a Global Navigational Satellite System (GNSS) measurement engine;
        calculates a value of a metric indicating a difference between the current estimated accuracy and a desired level of accuracy;
        generates at least one or more filtered value by filtering:
            (i) the calculated value of the metric indicating a difference between the current estimated accuracy and a desired level of accuracy, and
            (ii) a current value of at least one modifiable measurement parameter used in taking the current measurement,
            where the at least one modifiable measurement parameter comprises a duty cycle of one or more components used in at least one of radiofrequency (RF) signal reception and digital signal processing (DSP) of GNSS signals; and
        generates a value for each of the at least one modifiable measurement parameter to be used in taking a next measurement using the at least one filtered value; and
    the GNSS measurement engine which takes a next measurement using the generated value for each of the at least one modifiable measurement parameter.

12. The portable device of claim 11, wherein input received from a user of the portable device modifies the level of desired accuracy.

13. The portable device of claim 11, wherein membership of a group of the at least one modifiable measurement parameter varies based on at least one of current environmental conditions, current operating conditions, and a predetermined pattern.

14. The portable device of claim 11, wherein a total number of the at least one modifiable measurement parameter varies based on at least one of current environmental conditions, current operating conditions, and a predetermined pattern.

15. The portable device of claim 11, wherein the estimated accuracy of the current measurement from the measurement engine is measured in at least one of Dilution of Precision (DOP), vertical error, horizontal error, and clock error.

16. A portable device, comprising:
    at least one non-transitory computer-readable medium; and
    one or more processors, wherein the one or more processors, when executing a set of instructions stored in the at least one non-transitory computer-readable medium, controls the portable device to perform the following steps:
(a) calculating an estimated accuracy of a current measurement from a Global Navigational Satellite System (GNSS) measurement engine;
(b) calculating a value of a metric indicating a difference between the current estimated accuracy and a desired level of accuracy;
(c) generating at least one filtered value by filtering:
   (i) the value calculated in step (b), and
   (ii) a current value of at least one modifiable measurement parameter used in taking the current measurement,
   where the at least one modifiable measurement parameter comprises a duty cycle of one or more components used in at least one of radiofrequency (RF) signal reception and digital signal processing (DSP) of GNSS signals;
(d) generating a value for each of the at least one modifiable measurement parameter to be used in taking a next measurement using the at least one filtered value generated in step (c);
(e) taking a next measurement using the values for each of the at least one modifiable measurement parameter generated in step (d); and
(f) returning to step (a).

17. The portable device of claim 16, wherein input received from a user of the portable device modifies the level of desired accuracy.

18. The portable device of claim 16, wherein membership of a group of the at least one modifiable measurement parameter varies based on at least one of current environmental conditions, current operating conditions, and a predetermined pattern.

19. The portable device of claim 16, wherein a total number of the at least one modifiable measurement parameter varies based on at least one of current environmental conditions, current operating conditions, and a predetermined pattern.

20. The portable device of claim 16, wherein the estimated accuracy of the current measurement from the GNSS measurement engine is measured in at least one of Dilution of Precision (DOP), vertical error, horizontal error, and clock error.

* * * * *